United States Patent [19]

Watson

[11] Patent Number: 4,638,359

[45] Date of Patent: Jan. 20, 1987

[54] REMOTE CONTROL SWITCHING OF TELEVISION SOURCES

[75] Inventor: John N. Watson, Moorestown, N.J.

[73] Assignee: Westinghouse Electric Corp., Pittsburgh, Pa.

[21] Appl. No.: 496,030

[22] Filed: May 19, 1983

[51] Int. Cl.[4] .............................................. H04N 7/087
[52] U.S. Cl. ..................................... 358/147; 358/86; 358/142; 455/4
[58] Field of Search .................... 358/84, 86, 141, 142, 358/146, 147, 194.1, 143, 144, 185, 903; 455/3, 4; 340/800, 825.04, 825.63; 375/22

[56] References Cited

U.S. PATENT DOCUMENTS

| | | | |
|---|---|---|---|
| Re. 27,810 | 11/1973 | Buehrle | 375/23 |
| 2,418,127 | 4/1947 | Labin | 328/111 |
| 2,892,882 | 6/1959 | Hughes | 328/111 |
| 3,251,051 | 5/1966 | Harries et al. | 375/22 |
| 3,526,843 | 9/1970 | Sanville | 329/104 |
| 3,725,672 | 4/1973 | Reuter | 328/111 |
| 3,949,313 | 4/1976 | Tamada et al. | 328/111 |
| 3,996,586 | 12/1976 | Dillon et al. | 328/111 |
| 4,027,267 | 5/1977 | Larsen | 375/79 |
| 4,112,317 | 9/1978 | Everswick | 328/111 |
| 4,112,383 | 9/1978 | Burgert | 375/87 |
| 4,207,524 | 6/1980 | Purchase | 375/22 |
| 4,318,047 | 3/1982 | Dawson | 328/112 |

FOREIGN PATENT DOCUMENTS 8102961  10/1981  PCT Int'l Appl. ................. 358/147

*Primary Examiner*—James J. Groody
*Assistant Examiner*—Michael D. Parker
*Attorney, Agent, or Firm*—M. P. Lynch

[57] ABSTRACT

Binary data consisting of command signals and information is converted into a pulse width modulated waveform which is inserted in the non-picture portion of a television video signal and transmitted to remote local subscriber systems to control the television programming provided to local subscribers.

7 Claims, 11 Drawing Figures

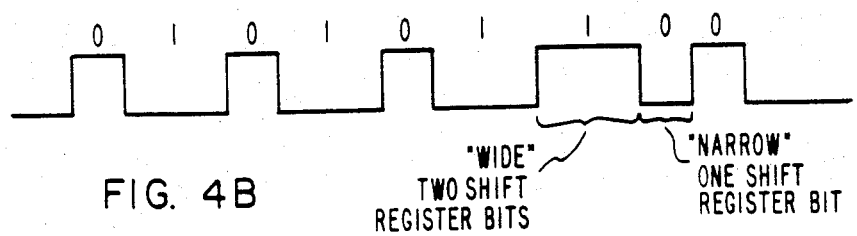
FIG. 4A
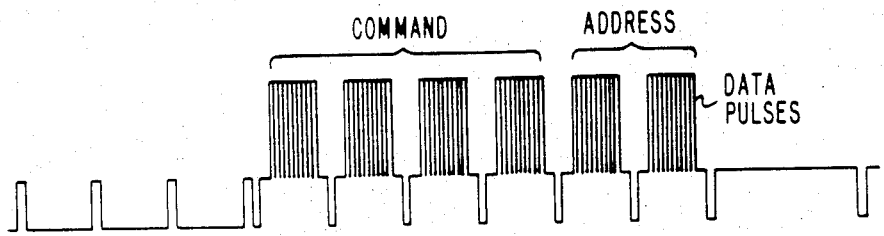
FIG. 4B
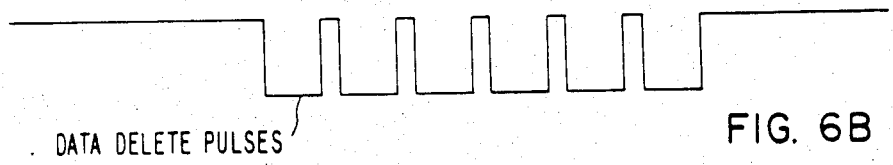
FIG. 6A
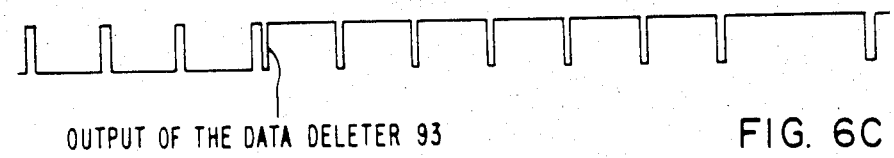
FIG. 6B
FIG. 6C

REMOTE CONTROL SWITCHING OF TELEVISION SOURCES

BACKGROUND OF THE INVENTION

The use of satellite distribution of television signals has introduced numerous opportunities and techniques for providing viewers with a wide variety of news, entertainment, educational and sports programming. Conceptually, a number of these opportunities require some means of accurately switching between different program sources and/or controlling local equipment at the satellite receive locations.

The 24 hour satellite news network represents one such situation wherein sources of news of a national, regional and local nature as well as regional and local commercial matter are each allocated time slots in a given hour of programming thus requiring the appropriate switching and machine control capability at each local cable television system hed end and the appropriate coordination of the various operations involved in producing and uplinking the news.

SUMMARY OF THE INVENTION

There is described herein with reference to the accompanying drawings a technique for implementing a switching concept wherein data inserted in the vertical blanking interval of a primary video signal transmission from a central uplinking facility is transmitted via satellite to a plurality of individual local cable television systems.

In a satellite communications news network, for example, wherein each local cable system would receive signals from two transponders on the same satellite, one for national news and the other for regional news, the primary national news transmission from the central uplink would include encoded data which, when interpreted by a decoder/controller/switcher apparatus at the cable system, would control the switching of the cable channel between the national news, the regional news, and a number of other possible sources including local news produced by the cable system, video tape playback, and special news coverage on other transponders.

The decoder section of the decoder/controller/switcher apparatus located at each receive location separates and removes the data from the vertical blanking interval of the primary video signal to thereby make the data available for control and information purposes and to make the primary video signal (absent the data) available for subscriber viewing.

A microcomputer included in the decoder/controller/switcher apparatus responds to the data by effecting the appropriate switching among the primary and various secondary video and audio program inputs, as well as performing various control functions such as starting and stopping video tape machines, tuning receivers, and actuating alarms and status indicators.

By assigning a unique address to each decoder apparatus, commands and information can be transmitted specifically to one receive location. Commands addressed to other locations are ignored. There is also provision for group addressing, whereby a single command can be transmitted to all locations within a specific region, and for universal addressing, whereby a single command can be sent to all locations within the system.

In addition to transmitting data to effect the desired switching and control functions at the cable system location, commands that change the information stored in the decoder microcomputer memories can be transmitted. Also, text information and other forms of data can be transmitted from the central facility.

A typical national system would be subdivided into a plurality of regions with each local cable system being supplied with the same national primary news transmission and a regional news transmission produced specifically for that geographical region.

The producers of regional news uplink their signals from a variety of geographical locations. Each regional uplink would be provided with a receiver which feeds the primary signal to a decoder/controller/switcher apparatus at the regional uplink which is similar to those used by the cable systems. Because each decoder/controller/switcher has a unique address, special commands can be sent to each regional uplink, prompting it to power up and prompting it to power down. Coordinating the regional uplinks in this manner is important since different regional uplinks use the same regional transponder at different times and they must not double illuminate the transponder. After powering up, a regional uplink is also given an "on air" indication, meaning that the cable systems in that region are now switched to regional.

DESCRIPTION OF THE DRAWINGS

The invention will become more readily apparent from the following exemplary description in connection with the accompanying drawings.

Figure 1:
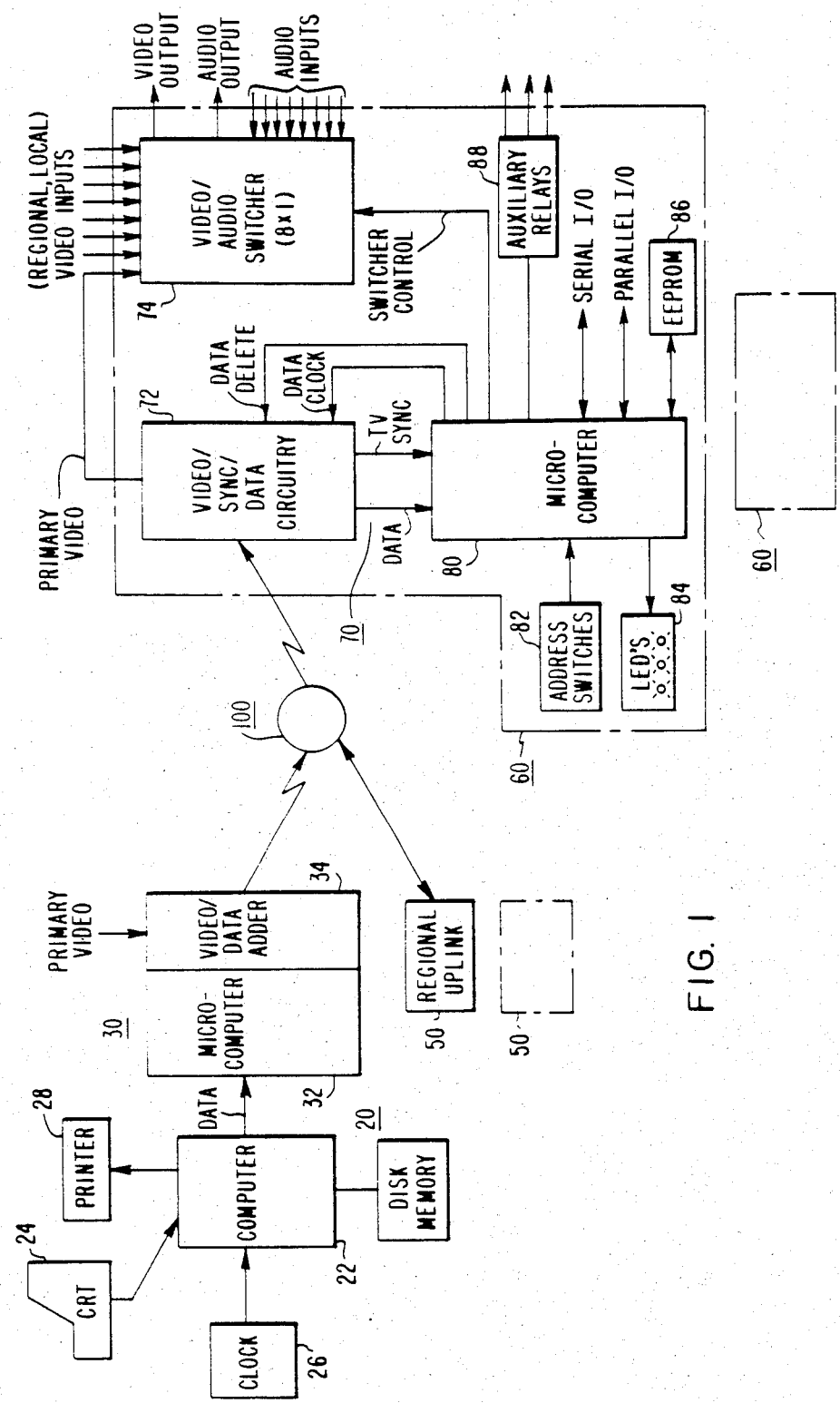
FIG. 1 is a block diagram schematic of a television system employing the novel encoder and decoder functions of the invention.
Figure 5A:
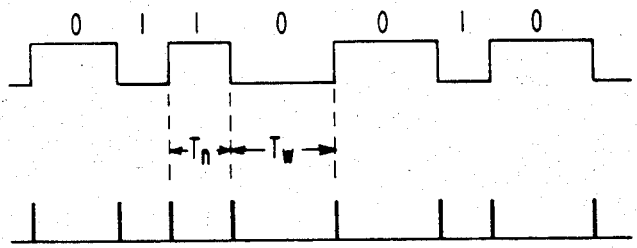
Figure 5B:
Figure 5C:
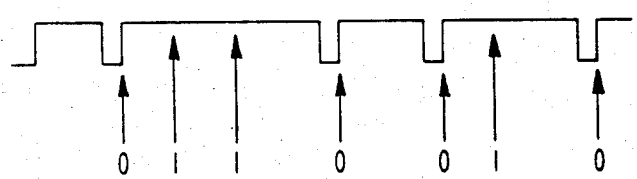

The waveforms of FIG. 4A and 4B illustrate the pulse width modulation technique employed to insert the data and information in the vertical blanking intervals of the primary video signal by the encoder of FIG. 1;

The waveforms of FIGS. 5A, 5B and 5C illustrate the separation and processing of the transmitted data by the decoder; and The waveforms of FIGS. 6A, 6B and 6C illustrate the format of the encoded data information and the pulse waveforms for deleting the data information from the transmitted primary video signal.

DESCRIPTION OF THE PREFERRED EMBODIMENT

Referring to FIG. 1 there is illustrated a television system 10 comprised of a central transmitting facility 20 having an encoder 30, linked to several region uplink facilities 50 and a plurality of local television subscriber receive systems 60 each including a decoder 70. The communications link between the central facility 20 and the regional uplink stations 50 and the local systems 60 may be realized through the use of a satellite communications link 100.

Data to be transmitted via the primary video signal to the respective decoders of the region uplink stations 50 and the local systems 60 are scheduled using a PDP11/23 data processing computer 22. A CRT terminal 24 displays system status and is used for modifying or manually overriding the schedule and for entering special commands for immediate execution. The resulting data consisting of address data and command data is transmitted from the data processing computer 22 to the microcomputer 32 of the encoder 30, in real time, normally in response to the time of day clock 26. An indication of the data sent is also transferred to a printer 28 for logging purposes.

The microcomputer 32 of the encoder 30 may be implemented through the use of a commercially available microprocessor type 6502 and appropriate input/output interfaces, random access memory and erasable programmable read only memory, with programming for the microcomputer 32 residing in the erasable programmable read only memory. The microcomputer 32 converts the data received from the computer 22 into binary information consisting of a train of pulse width modulated pulses which are supplied to the video/data adder circuit 34 of the encoder 30. In addition to receiving and storing the data, the microcomputer 32 performs, as programmed, certain real-time encoder functions that normally would have required more hardware. Because of the way in which the microcomputer 32 is interfaced to the other encoder hardware, many of the characteristics of the encoded data, such as the type of pulse modulation used and the grouping and location of the address and command pulses in the television field, are defined by the programming of the microcomputer 32. In the present implementation, the data is encoded into six groups of pulse width modulated pulses as shown in FIG. 6A. Each group follows one of the six trailing equalizing pulses in the vertical interval.

In the pulse grouping format of FIG. 6A the first two groups identify an address of a regional uplink 50 or a local system 60. The remaining four groups of pulse data contain the command or information to be transmitted to the designated regional uplink 50 or local system 60.

The adder circuit 34 combines the data pulses with the incoming primary television video signal.

The primary video/data signal transmitted by the satellite 100 to the decoder 70 of a local system 60 is applied to the video/sync/data circuitry 72 in the decoder 70. The video/snc/data circuitry 72 in the decoder 70 is interfaced to microcomputer 80 which is typically represented as a commercially available microprocessor 6502A in combination with random access memory, erasable programmable read only memory, and appropriate input/output interfaces. Also an electrically erasable programmable read only memory 86 is interfaced to the microcomputer 80. Programming for the microcomputer 80 may be stored in either the erasable programmable read only memory or the electrically erasable programmable read only memory 86.

The address for the local system 60 may be set manually by the address switches 82. Additional address information may be stored in the memory 86. If the address pulse data of the data received by the decoder 70 corresponds to the local system address the microcomputer accepts the command pulse data for execution. In addition to executing the received commands, the microcomputer 80 performs, under program control, certain real-time data decoder functions that otherwise would have required implementation in hardware.

The video/sync/data circuitry 72 has the following functions. First, it acts as a conventional television sync separator, or sync clipper, supplying composite sync to the decoder microcomputer 80. Second, it separates the data from the primary video signal and passes the data to the microcomputer 80. And third, it deletes the data pulses from the video signal.

The separating of the data and the deleting of the data are each enabled by control signals supplied to the video/sync/data circuitry 72 by the microcomputer 80. The exact timing of these control signals relative to the primary video signal is computed by the microcomputer 80 using the separated composite sync as a reference. For this reason, the location(s) within the television field (usually somewhere in the vertical interval) at which the decoder attempts to decode data depends upon the programming of the microcomputer 80 and not upon the decoder hardware.

Data delete pulses supplied by the microcomputer 80 are used in the video/sync/data circuitry 72 to remove the data from the vertical blanking interval of the video signal. The video signal, absent the data pulses, is then made available for local use as well as being provided as one input to video/audio switcher 74.

The microcomputer 80 processes and evaluates the command data identified by the proper address and initiates the appropriate control output responses including selection of the appropriate video and audio programming supplied as inputs to the video/audio switcher 74. The sequence of video and audio programs transmitted from the video/audio switcher 74 in response to switcher control signals from the microcomputer 80 are supplied to the cable subscribers within the designated region.

By controlling the exact times at which commands to switch the video section of the video/audio switcher 74 are executed, the microcomputer 80 is able to provide vertical interval switching whenever switching from primary video to some other source. Switching during the vertical interval of the previous source minimizes the disturbance to the picture. The primary composite sync signal, already interfaced to the microcomputer 80 for data decoding reasons, provides the microcomputer 80 with the necessary timing information to accomplish this. When switching between input video signals not synchronous with each other, sync from the other input video signals would have to be interfaced to the miroprocessor 80 in order to provide vertical interval switching in all directions.

The video/audio switcher 74 is a relay switcher. The relay coils are driven by drivers connected to parallel port output bits from the microprocessor 80. Small fastacting relays are used. Relatively consistent relay turn-on and turn-off delays allow the microcomputer 80 to anticipate these delays when vertical interval switching is required.

In addition to the primary video signal input transmitted from the central facility 20, additional programming inputs to the video/audio switcher may be provided by the regional uplink stations 50 and numerous local programming sources. The microcomputer 80 is also programmed to respond to command pulse data to develop output signals to activate start/stop machine control relays 88 of video recorders, etc. Front panel light indicators 84 provide visual indication of the operational status of the decoder 70.

Assume for the purpose of discussion, that the implementation of the system 10 of FIG. 1 is a news network application wherein switching and time allocation is provided to accommodate both the primary news service from the central facility 20 as well as regional news services from one or more regional uplink stations 50 and numerous local program sources. A typical sequence implemented by the command data pulses inserted in the vertical blanking interval may be such that at approximately four minutes and forty seconds into the hour, a standby-to-power up signal is sent from the central facility 20 to the regional uplink stations 50 that are next in line for regional news transmission. Thirty seconds later, the signal to power up is given. Fifty seconds later, at six minutes after the hour, the decoders 70 are switched in response to command data pulses to their regional programming input and the regional uplink stations 50 are cued to start their programs. Shortly before the end of the current regional news feed, a standby signal is sent to the next group of regional uplink stations. At the end of the current regional news segment a command is sent to return all decoders 70 to a primary video news feed and a signal is given to the regional uplink stations 50 that have just completed their regional news program to power down. A signal is then sent for the next group of regional uplink stations 50 to power up. A similar sequence is repeated for the remaining regions.

Through the use of special commands, the programming for new type commands and other software changes can be transmitted and down-loaded to the electrically erasable programmable read only memory 86. This capability makes possible nearly instantaneous updating of the program memories in each of the regional decoders 70 from the central facility 20.

Figure 2:
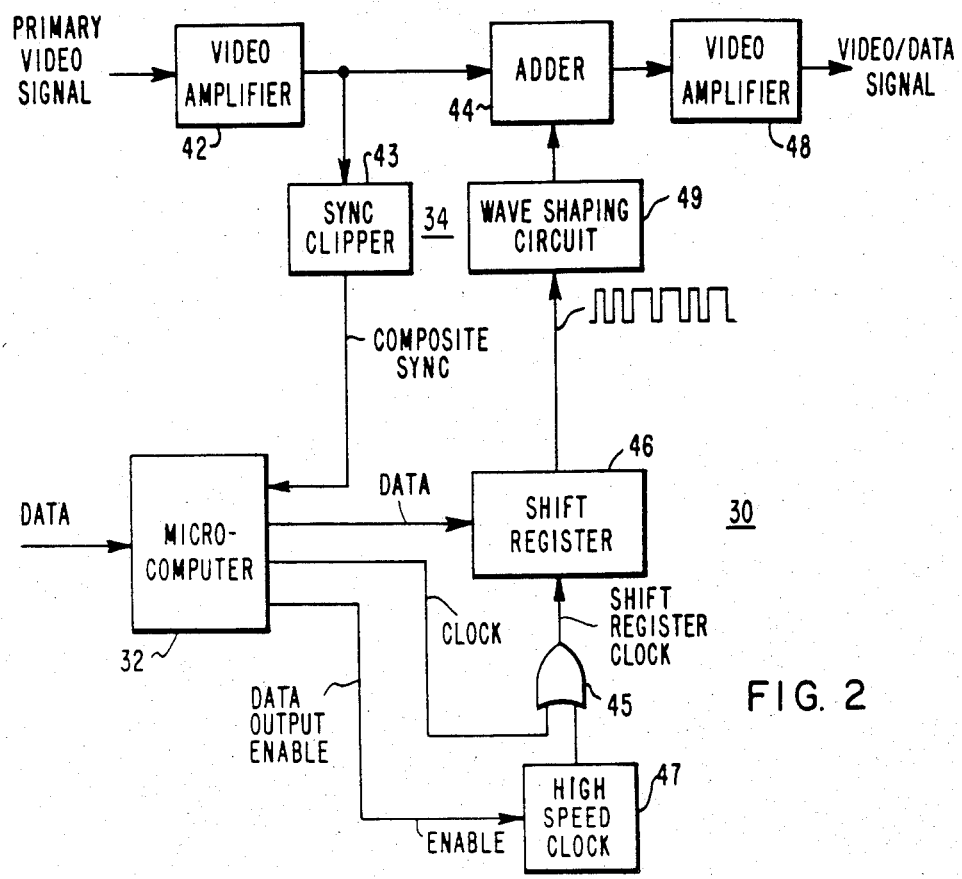
FIG. 2 is a block diagram schematic illustration of the encoder function of FIG. 1.

The encoder 30, as schematically illustrated in FIG. 2, consists basically of the microcomputer 32 and the video/data adder circuitry 34. The video/data adder circuitry 34 includes a video amplifier 42 which amplifies the incoming primary television video feed signal and supplies the resulting signal as an input to the sync clipper circuit 43 and to the adder circuit 44. Clock pulses from the microcomputer 32 act through OR gate 45 to enter the pulse width modulated command pulse data developed by the microcomputer 32 into the shift register 46.

The data and clock inputs to the shift register 46 of the encoder 30 are interfaced to the microcomputer 32 in a manner which allows the microcomputer 32 to load the shift register 46. The microcomputer preloads the shift register 46 with a bit pattern that exactly represents the waveform of the encoded signal that is to be combined with the video signal in the adder circuit 44. The resultant video/data signal is amplified by amplifier 48 and supplied to the satellite system 100. When the time to output the encoded signal occurs, the data output enable signal from the microcomputer 32 turns on the signal from a high speed clock oscillator 47 which, acting through the OR gate 45, shifts the signal waveform out of the shift register 46 at the proper rate. The microcomputer 32 can preload the shift register 46 at a relatively slow rate during the active picture portion of each field.

Assume for the purpose of discussion that microcomputer 32 is required to send the binary message 01 01 011 00 using an encoding scheme in which narrow pulses represent logic zeros and wide pulses represent logic ones. Programming in the microcomputer 32 will convert the data bit pattern of FIG. 4A to the shift register bit pattern or waveform of FIG. 4B. With each data bit, the microcomputer 32 flips the logic level sent to the shift register 46. The number of shift register bits used to represent a particular data bit determines its width and hence its encoded value. While in the waveform examples of FIGS. 4A and 4B, wide pulses are exactly twice the width of narrow pulses the only requirement is that there be an integer relationship between the wide and narrow pulses. The software of the microcomputer 32 further functions to determine how many pulses may be grouped together in a given time interval and ensures that each group of pulses begins and ends at the binary level corresponding to blanking.

When the pulse data is to appear in multiple groups of pulses, with pauses between the groups to avoid interference with certain parts of the television waveform such as the equalizing pulses, the microcomputer 32 is programmed to provide contiguous "no signal" bits in the correct locations of the pulse waveform stored in the shift register 46. Accordingly, the groups of pulses, as well as the pauses between the groups of pulses, form a single waveform pattern that is preloaded into the shift register 46 from the microcomputer 32 and is subsequently clocked out of the shift register 46 when a data output enable signal is generated by the microcomputer 32.

The microcomputer 32 detects vertical sync in the composite sync signal supplied by the sync clipper circuit 43, delays a preprogrammed amount, then at the correct time outputs a data output enable control signal to turn on a stream of high speed data clock pulses from the clock circuit 47 which act through the OR gate 45 to clock the shift-register 46. The high speed clock pulses clock the stored data waveform from the shift register 46 through the wave shaping circuit 49 to the adder circuit 44 wherein the pulse data is added linearly to the primary television video feed signal supplied to the adder circuit 44 by the video amplifier 42. The resultant combined video/data signal is then processed through video amplifier 48 and is available for transmission via the satellite 100 to remote decoders in the regional uplink stations 50 and the local television subscriber systems 60.

Thus the microcomputer 32 loads the shift register 46 at a relatively slow rate with the binary information ones and zeros which eventually serve as the command pulse data to be added to the television signal. With reference to the composite sync signal from the sync clipper 43, when correct timing within the vertical blanking interval of the primary television video feed has been detected by the microcomputer 32, the microcomputer 32 causes the data to be clocked from the shift register 46 at a steady high speed rate in response to the clock pulses from the clock circuit 47. The data stored in the shift register 46 is the waveform developed by the microcomputer 32 in response to the binary ones and zeros of the instructions received from computer 22. Thus the data clocked into the shift register 46 from the microcomputer 32 does not consist of ones and zeros but a pulse width modulated waveform representing the binary data generated by the computer 22.

The wave shaping circuit 49 serves to control the pulse rise and fall times as well as the shape of the pulses. The adder 44 is an analog circuit which linearly adds the pulses to the video.

Figure 3:
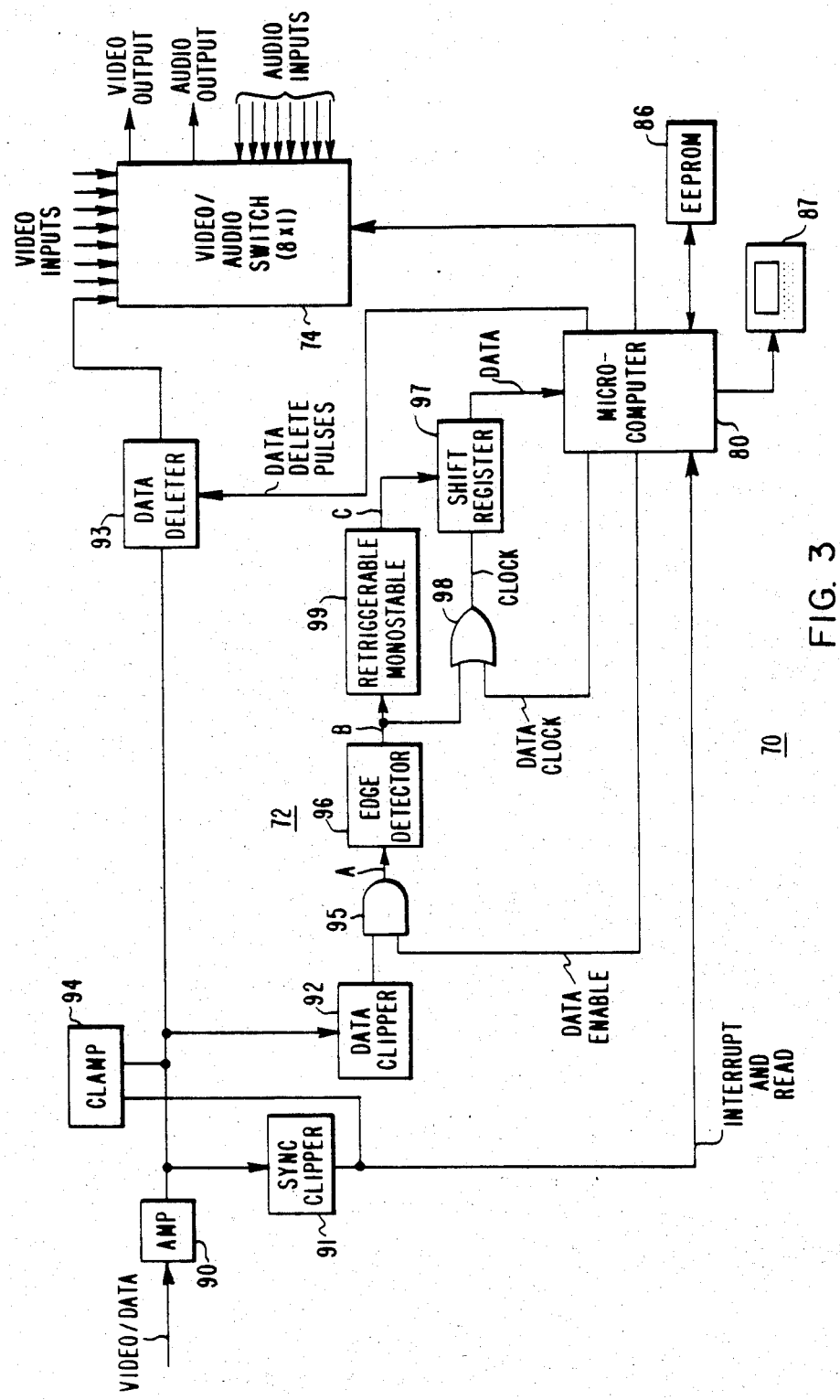
FIG. 3 is a block diagram schematic illustration of the decoder function of FIG. 1.

Referring to FIG. 3 there is illustrated a block diagram schematic of the decoder 70 which details an implementation of the video/data separator 72 as it functionally interfaces with the video/audio switcher 74 and microcomputer 80. The primary video/data signal transmitted from the central facility 20 via the satellite 100, and shown in the waveform of FIG. 6A, is received by the decoder 70 as an input to the amplifier circuit 90. The amplified video/data signal is supplied as an input to the sync clipper circuit 91, the data clipper circuit 92 and the data deleter circuit 93. An active clamp circuit 94 is required to maintain the d-c level of the video/data signal to assure consistent signal level for the removal of the pulse data information and the insertion of the correct blanking level. The sync clipper 91 functions to strip the composite sync signal from the video/data signal and the resulting composite sync signal is supplied as an interrupt and read signal to the microcomputer 80. The software of the microcomputer 80 recognizes the presence of a valid vertical sync pulse, delays for an appropriate interval, and then generates a data enable pulse, to effect the gating of the pulse data from the data clipper circuit 92 through the AND gate 95 to the edge detector circuit 96. Inasmuch as the rate at which the data is decoded exceeds the reading speed of the microcomputer 80, the data is supplied to the shift register 97. The data clipper circuit 92 is adjusted to clip the video signal at some predetermined level between the extremes of the data pulses. The timing of the data enable pulse ensures that the information provided to the shift register 97 is only data and does not include transitions due to data clipper 92 clipping of other features of the video/data waveform.

The waveform of the information supplied as the input signal to the edge detector circuit 96 is illustrated as the waveform of FIG. 5A. The edge detector circuit 96 is responsive to the edges, i.e. the rising and falling transitions in the waveform of FIG. 5A, and generates a pulse for every transition. The width of the pulse developed by the edge detector circuit 96 is relatively small as shown in the waveform of FIG. 5B. It is the output of the edge detector circuit 96 that is used for data decoding. The purpose of the decoder 70 is to discriminate between the "wides" and "narrows" of the pulse width modulated data transmitted in the vertical blanking interval of the video/data signal and received by the amplifier 90, and to represent the "wides" and "narrows" in a pattern of logic ones and zeros. Here the terms "wides" and "narrows" refer to the relative amounts of time between successive transitions in the encoded data waveform. The output of the edge detector 96, acting through OR gate 98, clocks or shifts, by one shift register bit position, each successive value of the decoded data into the shift register 97. One bit of decoded data is stored in the shift register 97 for each transition in the transmitted pulse waveform.

The data input to the shift register 97 corresponds to the output of the retriggerable monostable pulse generator circuit 99 which is triggered by the edge pulse output of the edge detector circuit 96. The period of the monostable pulse generator circuit 99 is established between Tn, the duration of a "narro", and Tw, the duration of a "wide". If after the retriggerable monostable 99 is triggered by an edge pulse, a second edge pulse occurs at time Tn, the output of the monostable 99 will still be asserted at the time of the second edge pulse. On the other hand, if after the retriggerable monostable 99 is triggered by an edge pulse, a second edge pulse occurs at time Tw, corresponding to a "wide" time, the monostable will have timed-out and returned to its off state prior to the occurrence of this second pulse. Thus, referring to the waveform of FIG. 5C, which corresponds to the output of circuit 99, the output of the retriggerable monostable pulse generator circuit 99 will be high or low depending upon the time interval between successive edge pulses. Hence each edge pulse will clock through the shift register 97 a data value corresponding either to a logic one or a logic zero depending on the amount of time that has elapsed between successive pulses supplied to the circuit 99.

The waveform of FIG. 5A is the encoded data signal which, when applied to the edge detector circuit 96 of FIG. 3, results in a pulse output waveform of relatively narrow pulses as shown in the waveform of FIG. 5B. This corresponds to each transition in the waveform of FIG. 5A. In the waveform of FIG. 5B the encoded digital information resides in the timing between successive pulses. Hence the output of the monostable circuit 99, which is represented by the waveform of FIG. 5C, is the decoded data output.

Since the same pulse output of the edge detector 96 is used both to trigger the monostable circuit 99 and to clock the shift register 97, circuit delays should be made such that the output is read before the resetting effect of triggering the monostable circuit 99 is able to appear at the output. Where normal circuit propagation times do not provide delays, a small amount of time delay can be added anywhere in the signal path of the monostable.

Correct timing also can be achieved without resorting to added delay circuitry by taking advantage of the small finite width of the edge pulses themselves. Reading of the monostable 99 output may be performed on the leading edges of the pulses of the waveform of FIG. 5B while triggering of the monostable 99 may be made to occur in response to the trailing edges.

The microcomputer 80 has a control line which is also capable of clocking the shift register 97. The data clock signal from the microcomputer 80 is transmitted to the shift register 97 through the OR gate 98 and causes the data bits stored in the shift register 97 to be transferred to the microcomputer 80 at the rate which is compatible with the data processing capabilities of the microcomputer 80. The microcomputer 80 performs parity operations on the data and checks the address. If the address of the data corresponds to the local system address the microcomputer 80 formats the data into a recognizable format and stores the data in memory. The data received may be command pulse data for controlling the video/audio switcher 74 or it may consist of software program changes which are to be down-loaded in memory. Updated software information may be down-loaded to the electrically erasable programmable read only memory 86. The data may also be text material to be displayed on a local monitor 87 to provide information and instruction to personnel located at the receive location 60.

A train of data delete pulses as shown in the waveform of FIG. 6B is transmitted from the microcomputer 80 to the data delete circuit 93. The data delete circuit 93 removes the data pulses from the waveform of FIG. 6A and produces an output primary video signal, absent the data pulses, as shown in the waveform of FIG. 6C. The action of the data delete circuit 93 restores the vertical interval of the primary video signal to normal prior to providing the primary video signal as an input to the video/audio switcher 74.

The data delete pulses are each initiated by the microcomputer 80 slightly before each burst of data pulses and are each terminated before the next equalizing pulse occurs so that the data pulses are deleted and the equalizing pulses are not.

For the type of pulse width modulation used, the time required to transmit a message containing a fixed number of bits will depend upon the content of the message, that is, upon the fraction of those bits that are represented by "wides" rather than by "narrows". The worst case message would consist entirely of "wides". In order to improve the efficiency of data transmission, a pulse data format has been chosen such that the pulses representing a given message conform to one of two possible conventions. For a given binary message from the computer 22 "wides" may represent either logical ones or logical zeros, depending on the ones count in the binary message. For example, if the binary data received from the computer 22 consists of a majority of logic ones then "narrows" wll be assigned to the logic one content of the input binary data and "wides" will be assigned to logic zeros. Conversely, if logic zeros represent the majority of the binary data received from computer 22, the encoder 30 will assign "narrows" to the logic zero binary information and "wides" to the logic one binary information. In this manner more efficient transmission is achieved by predetermining that, for any message, the number of "wides" will never exceed the number of "narrows". The terms "wides" and "narrows" refer to the durations between successive transitions, described above with reference to the waveform of FIG. 5A.

A mode bit somewhere in the transmission defines for the decoder which convention is being used. While the mode bit may occur at any point in the transmitted pulse data, it is assumed for the purposes of discussion that the mode bit is the first bit in each transmitted data message.

The microcomputer 32 of the encoder 30 takes the binary data message which is to be added to the television video signal and counts up all the logic zeros and logic ones and assigns the "narrows" to represent the logic level which appears most often in the message and indicates this with a mode bit. If the mode bit is a "wide" then the "wides" of the data message are logic zeros. The conversion of the binary data message is a software function of the microcomputer 32.

The microcomputer 80 in the decoder 70 receives the series of ones and zeros from the shift register 97 and responds to the mode bit to interpret the logic one and zero content of the message.

While the software of the microcomputer can prevent the computer from misinterpreting spaces between predetermined groups of data pulses as "data" it may be desirable to include circuitry to effect this function in the event the number of pulses may vary from group to group. This function can be realized through the use of a monostable triggered by the edge detector 96 and designed to time out at a time duration greater than the "wide" pulse and less than the space between groups of pulses. This time out action would terminate the clocking of the shift register 97.

I claim:

1. Apparatus for transmitting command and control information from a central television programming source to one or more remote local television subscriber systems via encoded signals combined with video signals of a video program comprising,
    data generating means for developing binary command data messages,
    computer means for converting the binary command data messages into a pulse width modulated waveform representing the binary command data message,
    a shift register means having data and clock inputs operatively connected to said computer means said computer means loading said shift register means with a bit pattern that represents said pulse width modulated waveform, the number of shift register bits used to represent a particular data bit determining the width of the corresponding pulse in the waveform and hence its encoded value,
    a high speed clock means for shifting said waveform out of said shift register means,
    a sync detector circuit means for supplying sync information of said video signals to said computer means, said computer means responding to the vertical sync information by enabling said high speed clock means to shift said waveform from said shift register, and
    adder means for inserting said pulse waveform output from said shift register means into the vertical blanking interval of the video signal of the video program for transmission to the remote local television subscriber system,
    said pulse width modulated waveform consisting of narrow pulses and wide pulses, said computer means counting the logic zeros and logic ones in each binary command data message received from said data generating means and assigning the narrow pulses to represent the logic level which appears most often in the message and further including a mode bit in transmitted waveform to alert the local systems as to which pulse width corresponds to which logic level.

2. Apparatus for transmitting command and control information from a central television programming source to one or more remote television systems via encoded signals combined with television video signals of a video program comprising,
    data generating means for developing binary data messages comprising command and control information,
    computer means for converting the binary data message into a pulse waveform representing the binary data message,
    a shift register means having data and clock inputs operatively connected to said computer means, said computer means loading said shift register means with a bit pattern representing said pulse waveform, the number of shift register bits used to represent a particular data bit determining the width of the corresponding pulse and hence the encoded value,
    a clock means for shifting said waveform out of said shift register means,
    a sync detector circuit means for supplying sync information from said video signals to said computer means, said computer means responding to the vertical sync information by enabling said clock means to shift said waveform from said shift register, and
    adder means for inserting said waveform output from said shift register means into a non-video portion of a television video signal of the video program for transmission to one or more of the remote television systems.

3. In the apparatus as claimed in claim 2 wherein said pulse waveform is comprised of narrow pulses and wide pulses, said computer means counting the logic zeros and logic ones in each binary data message received from said data generating means and assigning the narrow pulses to represent the logic level which appears most often in the message.

4. Apparatus for transmitting non-video information from a television programming source to one or more television systems via encoded signals combined with television video signals; comprising,
  data generating means for developing a binary data message corresponding to said non-video information,
  computer means for converting the binary data message into a pulse waveform comprising a pulse grouping format including address and command information representing the binary data message,
  means for combining said pulse waveform with said television video signals in response to control output signals from said computer means, said computer means developing said control output signals in response to the sync information of said television video signals.

5. In a system for communicating between one or more television video programming sources and one or more television systems to provide non-video data and information to update and control the video programming occurring at one or more of said television systems, the combination of,
  one or more television video signal sources including:
  data generating means for developing binary data messages corresponding to non-video information,
  computer means for converting each binary data message into a pulse waveform comprising a pulse grouping format including address and command information representing the binary data message,
  means for combining said pulse waveform of said computer means with a television video signal in response to sync information of said television video signal,
  one or more remote television systems,
  means for transmitting said television video signal said pulse waveform to at least one of said television systems,
  each of said television systems including:
  a video decoder means for accessing said pulse waveform from said television video signals and providing said pulse waveform as a separate information output signal, and
  a computer means responding to said information output signals from said video decoder means corresponding to a pulse waveform having a predetermined address by generating output control signals consistent with the command information content of said pulse waveform for controlling the operation of said television system.

6. Apparatus as claimed in claim 4 wherein said means for combining said pulse waveform with said television signal comprises,
  a shift register means having data and clock inputs operatively connected to said computer means, said computer means loading said shift register means with a bit pattern representing said pulse waveform, the number of said shift register bits used to represent a particular data bit determines the width of a corresponding pulse and hence the encoded value,
  a clock means for shifting said waveform out of said shift register means, a sync detector circuit means for supplying sync information from said video signals to said computer means, said computer means responding to the sync information by enabling said clock means to shift said waveform from said shift register, and
  adder means for inserting said waveform output from said shift register means into a non-video portion of said television video signals in response to said control output signals from said computer means.

7. In a system as claimed in claim 5 wherein said means for combining said pulse waveform with said television video signal comprises,
  a shift register means having data and clock inputs operatively connected to said computer means, said computer means loading said shift register means with a bit pattern representing said pulse waveform, the number of said shift register bits used to represent a particular data bit determines the width of a corresponding pulse and hence the encoded value,
  a clock means for shifting said waveform out of said shift register means, a sync detector circuit means for supplying sync information from said video signals to said computer means, said computer means responding to the sync information by enabling said clock means to shift said waveform from said shift register, and
  adder means for inserting said waveform output from said shift register means into a non-video portion of said television video signals in response to said control output signals from said computer means.

* * * * *